United States Patent [19]

Hasegawa

[11] Patent Number: 5,361,145
[45] Date of Patent: Nov. 1, 1994

[54] COLOR IMAGE READING APPARATUS HAVING CORRECTION MEANS TO CORRECT FOR RELATIVE VARIATIONS AMONG IMAGE SIGNALS

[75] Inventor: Shizuo Hasegawa, Tokyo, Japan

[73] Assignee: Canon Kabushiki Kaisha, Tokyo, Japan

[21] Appl. No.: 973,951

[22] Filed: Nov. 9, 1992

[30] Foreign Application Priority Data

Nov. 12, 1991 [JP] Japan .................. 3-295683

[51] Int. Cl.⁵ .............................. H04N 1/46
[52] U.S. Cl. ........................ 358/514; 358/513; 250/208.1
[58] Field of Search .................. 358/75–80, 358/513–514, 511, 512; 359/227, 229, 205, 232, 209–210; 356/233; 382/47, 56; 250/208.1, 237 R; 355/55–56

[56] References Cited

U.S. PATENT DOCUMENTS

| | | | |
|---|---|---|---|
| 4,907,076 | 3/1990 | Ohsawa | 358/80 |
| 4,953,014 | 9/1990 | Takaragi | 358/77 |
| 4,985,760 | 1/1991 | Maeshima et al. | 358/80 |
| 5,173,599 | 12/1992 | Setani | 250/208.1 |

FOREIGN PATENT DOCUMENTS

| | | |
|---|---|---|
| 0363146 | 4/1990 | European Pat. Off. |
| 0383308 | 8/1990 | European Pat. Off. |
| 0410700 | 1/1991 | European Pat. Off. |
| 0501814 | 9/1992 | European Pat. Off. |

*Primary Examiner*—Stephen Brinich
*Attorney, Agent, or Firm*—Fitzpatrick, Cella, Harper & Scinto

[57] ABSTRACT

A color image reading apparatus is described which has a blazed diffraction grating that diffracts light from an original document, a CCD that converts the diffracted light into electrical image signals, and a filter circuit that performs a smoothing process or an edge emphasising process on the image signals from CCD.

15 Claims, 19 Drawing Sheets

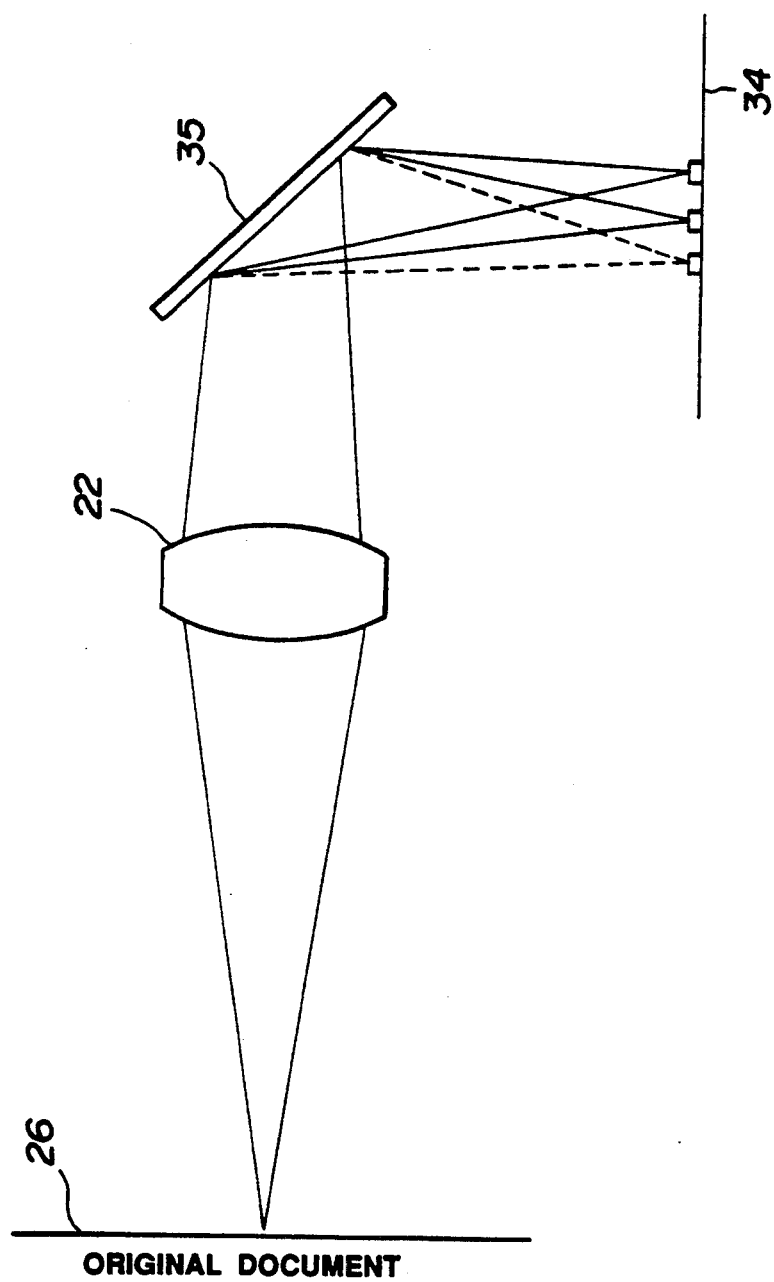

FIG.9(a)
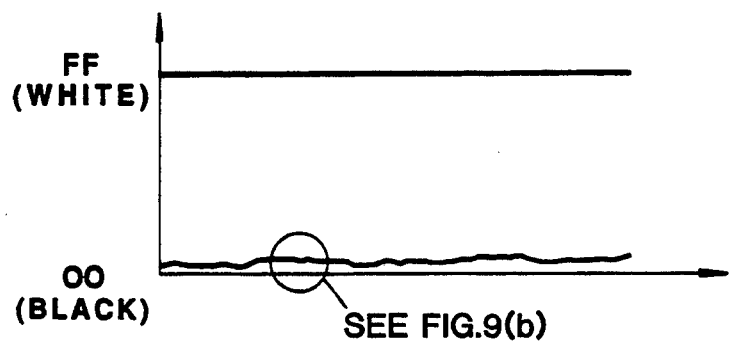
FIG.9(b)
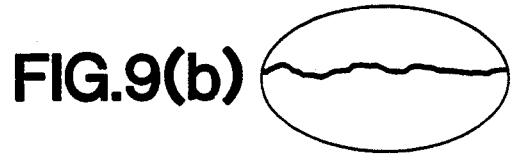
FIG.11
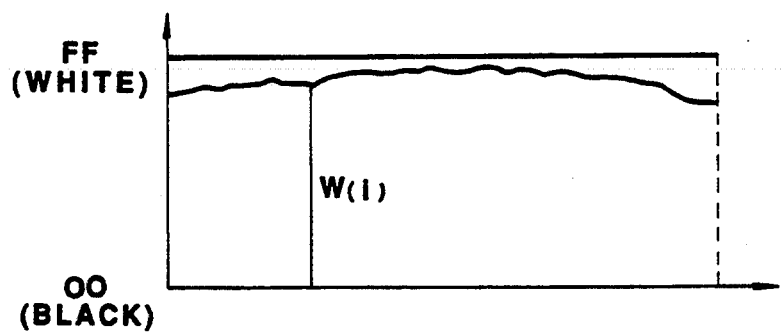
FIG.12
| W1 | W2 | ---- | Wi | ---------- | W4752 |
|----|----|------|----|------------|-------|
| FFH/W1 | FFH/W2 | ---- | FFH/Wi | ---------- | FFH/W4752 |
|--------|--------|------|--------|------------|-----------|

FIG.19
C1 : 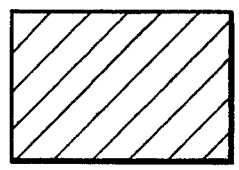
C2 : 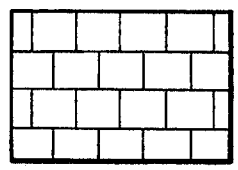
C3 : 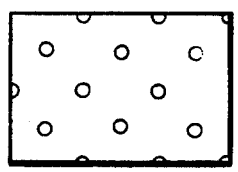
C4 : 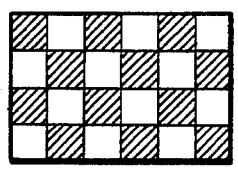
C5 : 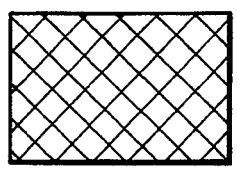
C6 : 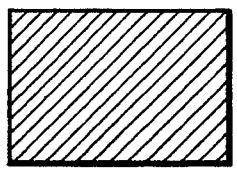

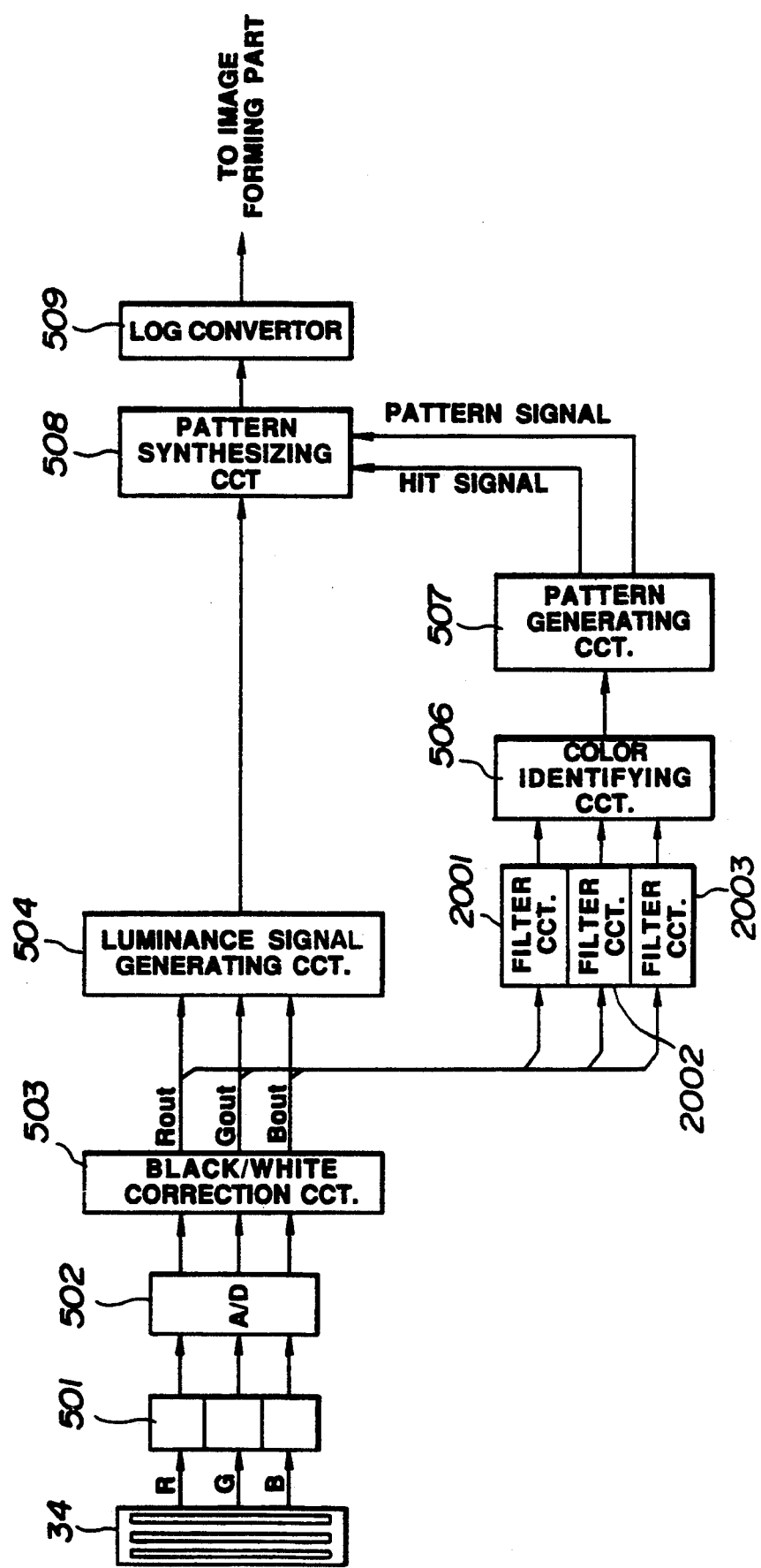

COLOR IMAGE READING APPARATUS HAVING CORRECTION MEANS TO CORRECT FOR RELATIVE VARIATIONS AMONG IMAGE SIGNALS

BACKGROUND OF THE INVENTION

This invention relates to a color image reading apparatus for photoelectrically reading a color image, and more particularly to color image reading apparatus, having image sensors arranged in a parallel, for reading a color image line by line.

A digital copying machine, which illuminates an original document, converts reflected light from the original document into an electric signal by using a photoelectric conversion device, such as a CCD, processes the electric signal and forms an image on the basis of the processed electric signal by using a laser beam printer (LBP), an LED printer or an ink jet printer, is known.

Recently, a full color digital copying machine, which can treat a full color image, has been developed.

To read a full color image of an original document, the following two methods are generally used.

(1) Reading a full color image by using a single line sensor which has a plurality of photosensitive elements provided with red filters, green filters and blue filters as shown in FIG. 1(a), so as to obtain red (R), green (G) and blue (B) image data. The assignee of the present application has proposed a reading method of this type in U.S. Pat. No 4,907,076 (CFO 4730 US).

(2) Reading a full color image by using three line sensors, arranged in parallel, which have red filters, green filters and blue filters, respectively, as shown in FIG. 1 (b), so as to obtain R, G, B image data. The assignee of the present application has proposed a reading method of this type in U.S. Pat. No 4,953,014 (CFG 108 US).

In method (1), however, it is impossible to obtain the three color image data of an identical point of the original document, because photosensitive elements having R, G, B filters cannot read the identical point.

Besides, for reading a color image of the original document of A3 size with 400 dpi (=16 dots/mm) it is necessary that the single line sensor has approximately 14,000 photosensitive elements. However, such a single line sensor having a large number of photosensitive elements has not been produced, because of disadvantages in the efficiency of producing such a sensor. Therefore, such a long line sensor is composed by connecting a plurality of short line sensors each having approximately 3,000 photosensitive elements, so a precise correction is needed for compensating the difference in the characteristics of each of the short line sensors.

On the other hand, in method (2), it is impossible to obtain the three color image data of an identical point of the original document at the same time, because three line sensors each read different lines of the original document at the same time. Therefore, outputs from line sensors must be delayed by the time corresponding to the intervals among the line sensors so as to obtain three color image data of the same line.

However, some noise, such as ghost images, occur at the color boundaries, if the speed of relative movement between the original document and the line sensors which scan the color image, is not constant.

In view of these circumstances, the assignee of the present application has proposed in USSN 863,782 (CFO 8354 US) a method in which the reflected light from the original document is color separated by using an optical device, such as a blazed diffraction grating, and three color images of the identical point of the original document are each focused on different positions. FIG. 2 shows schematic illustration of this method. According to this method, the three color image data of an identical point of the original document can be obtained at the same time, so the problems described above with regard to the method (1) or (2) do not occur.

In the color separation system using the blazed diffraction grating as shown in FIG. 2, however, the distances between a lens 22, a one-dimensional blazed diffraction grating 35 and a three-line CCD 34, the separation angles of R, G, B by the one dimensional blazed diffraction grating 35, and the intervals between the line sensors on the three-line CCD 34 which are defined in accordance with the distances and the separation angles, should be set very precisely.

If the distance between the one-dimensional blazed diffraction grating 35 and the CCD 34 is shorter than the optimum distance, the outputs of each line sensor are shown in FIG. 3(b) when the black line along the main scanning direction is read.

The output of the G-CCD becomes rather dull, as compared with the output shown in FIG. 3(a) which is the output when the distance is optimum.

Also, the outputs of the R-CCD and B-CCD become very dull because unsuitable diffracted light components from the blazed diffraction grating 35 are mixed in the R-component or the B-component light.

On the other hand, the deterioration of the outputs of CCDs is caused by not only the arrangement of the blazed diffraction grating and CCD but also the light wavelength characteristics. Accordingly, even if the blazed diffraction grating and CCD are precisely set, for example, the Modulation Transfer Functions (MTFs) of the outputs of R-CCD and B-CCD may be lower than that of G-CCD.

Therefore, the edges of the black line along the main scanning direction of CCD cannot be recognised as black image and may be recognised as color image, because an R-component signal and a B-component signal are erroneously generated at the leading part of the R-output and the trailing part of the B-output, respectively, as shown in FIG. 3.

Accordingly, if a color-pattern conversion process that recognises an image having a particular color in a full color image and converts the recognised image into a predetermined pattern, is performed, the black image will be erroneously recognised as a color image and will be converted into the predetermined pattern. So, the image subjected to the color-pattern conversion process will not be properly reproduced. The color pattern process has been proposed in USSN 843,725 and European Patent published application number 0501814 (CFO 8271 US, EP) by the assignee of the present application and, in the color pattern conversion process, an achromatic image such as white and black images should not be converted into the pattern.

Moreover, if a black letter extraction process, that recognises black letters in a full color image and reproduces the recognised black letters in a different way from other color images, is performed, the black letters will not be properly recognised and will be reproduced as a color image. The black letter extraction process has been proposed in USSN 416,587 and European Patent published application number 0363146 (CFO 6399 US EP) by the assignee of the present application.

Besides, in case of reproduction of a full color image, some deteriorations, such as the blurredness of color, the ghost and so on, may occur at the boundaries of color.

SUMMARY OF THE INVENTION

The present invention has been made in light of the above problems and its object is to provide a color image reading apparatus which can suitably read a color image.

The present invention also provides a color image reading apparatus which can read a color image without the deviation of color.

The present invention also provides a color image reading apparatus which can easily obtain three-color signals representing an identical point or line of a color image without a complex electrical process.

The present invention also provides a color image reading apparatus which can suitably color-separate a color image by compensating the error which occurs by the deviation of the arrangement of optical devices.

The present invention also provides a color image reading apparatus which can accurately recognise black image or letter in a color image.

The present invention also provides a color image reading apparatus which can generate color image signals by which black image or letter can be suitably reproduced without the occurrence of the ghost or the blurredness of color at the edge of the black image or letter.

According to an aspect of the present invention, there is a color image reading apparatus comprising an optical device for diffracting light from a color image and sending out a plurality of beams of light, each beam representing at least one of a plurality of different colors, in different directions; a plurality of line sensors each for receiving at least one of the plurality of beams of light and converting it into electrical image signals; and correction means for correcting the unevenness among the image signals from the plurality of line sensors caused by the optical device for diffracting light.

In a preferred embodiment, the optical device comprises a one-dimensional blazed diffraction grating, furthermore the plurality of line sensors are arranged on a single substrate and the correction means comprises filter means for a filter process on the image signals from at least one of the plurality of line sensors.

The above and other aspects, features and advantage of the present invention will become apparent from the following detailed description of the preferred embodiments of the invention referring to the accompanying drawings.

BRIEF DESCRIPTION OF THE DRAWINGS

FIG. 2 is a schematic diagram showing the construction of an optical system using a one-dimensional blazed diffraction grating;

FIG. 5a is a diagram showing the construction of the three-line CCD incorporated in the copying machine of FIG. 4;

FIG. 5b shows an enlarged area of the CCD shown in FIG. 5a;

FIG. 9a–9b are diagrams for describing a black level correction;

FIG. 11 is a diagram for describing a white level correction;

FIG. 12 is a diagram for showing the content of a white level RAM;

FIG. 19 is a diagram showing patterns corresponding to six different hues;

FIG. 23 is a block diagram showing a further construction of an image processing circuit in accordance with an embodiment of the invention.

DESCRIPTION OF THE PREFERRED EMBODIMENT

Figure 1A:
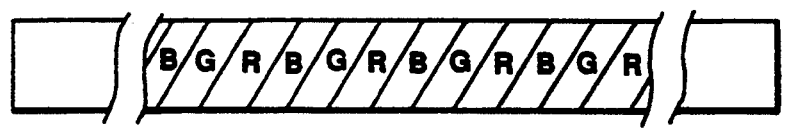
FIGS. 1a and 1b are diagrams showing the construction of a color image sensor.
Figure 1B:
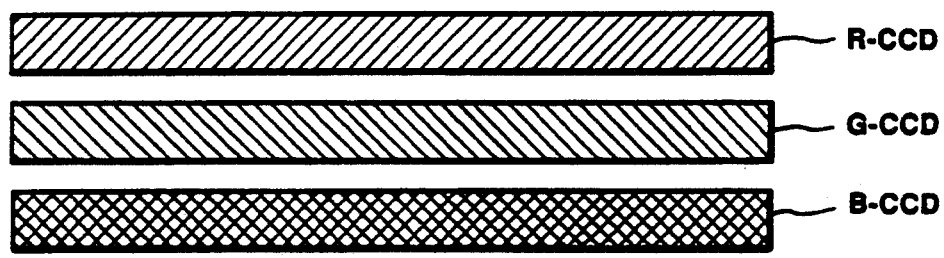
Figure 3:
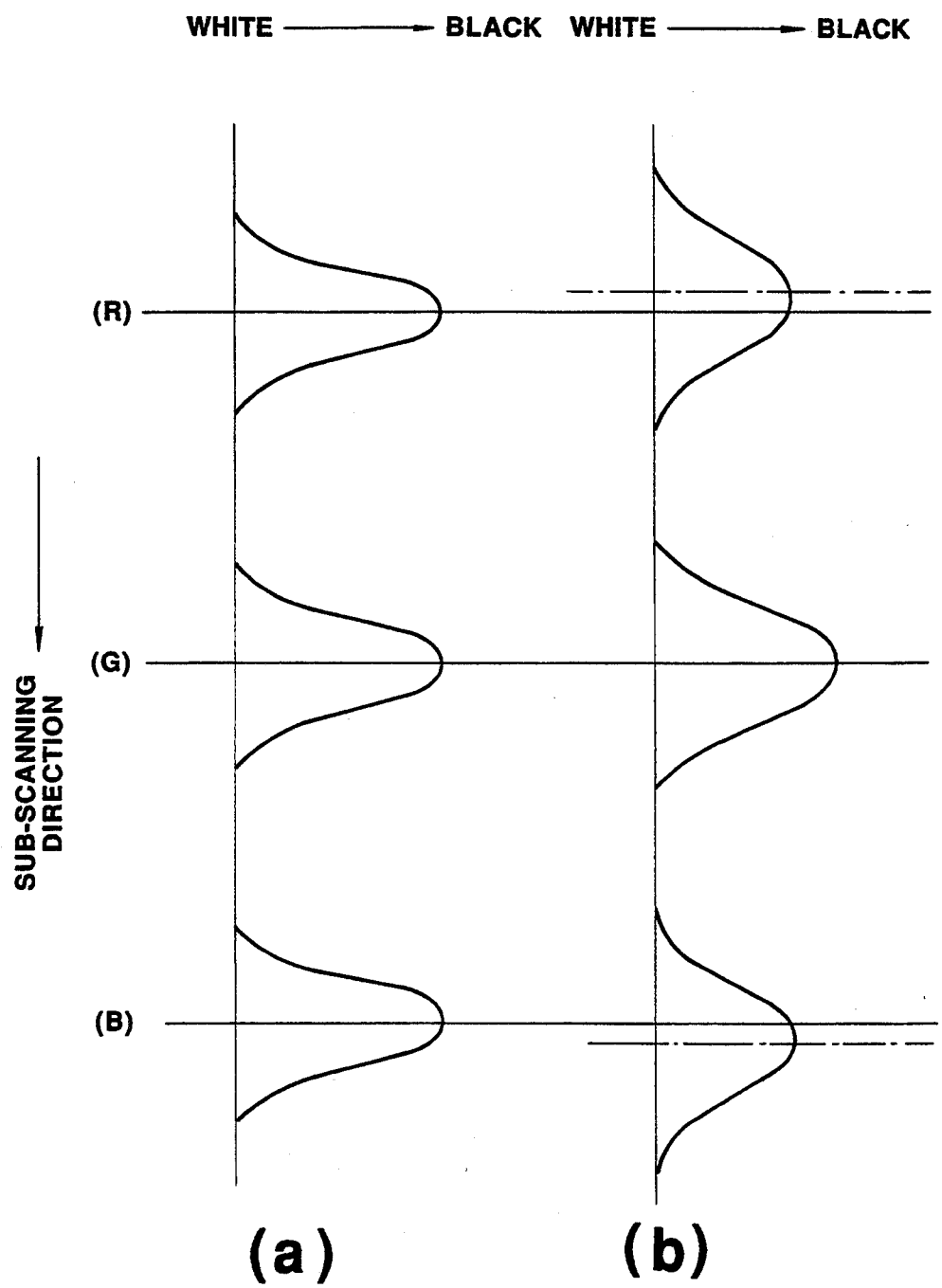
FIG. 3 is a diagram showing the characteristics of the outputs of a three-line CCD.
Figure 4:
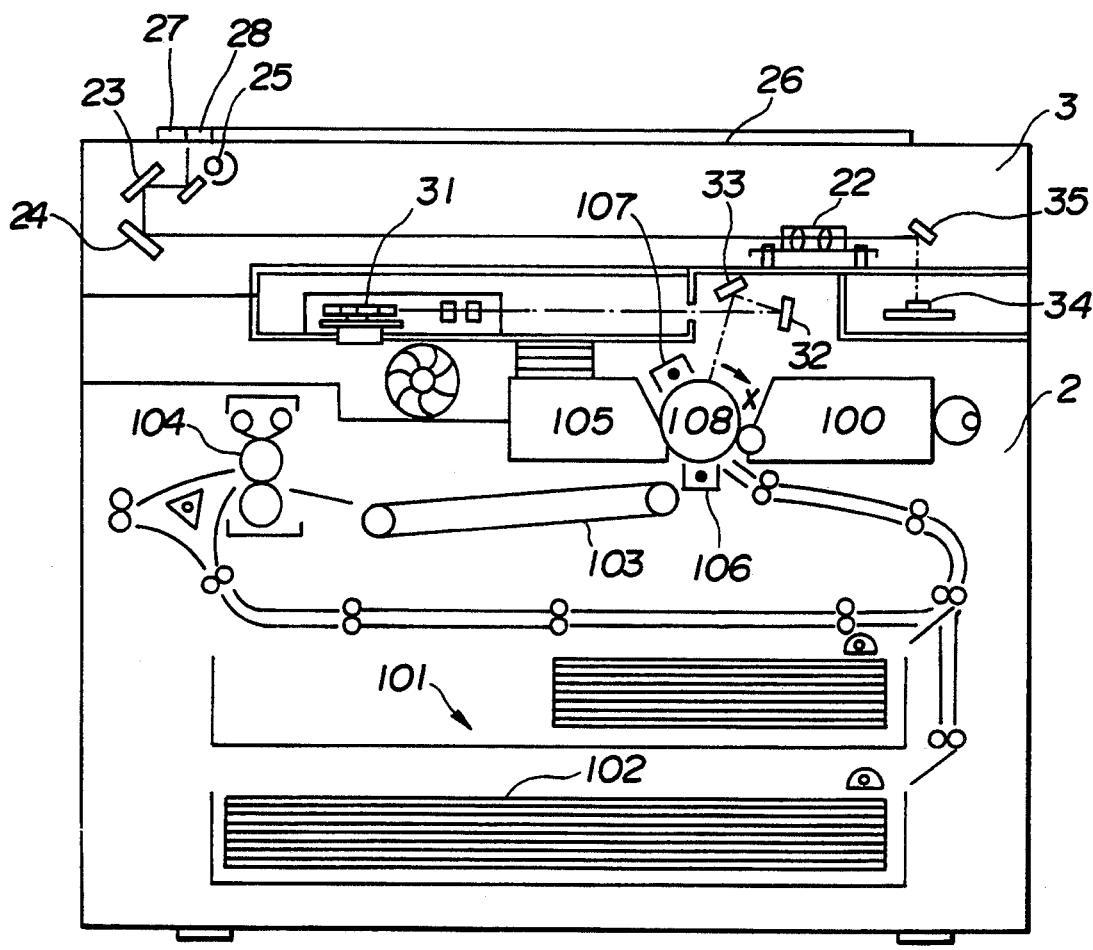
FIG. 4 is a sectional view showing a copying machine in accordance with an embodiment of the invention.

FIG. 4 is a sectional view showing a copying machine which employs the color image reading apparatus of the present invention.

The copying machine has a reading part 3 which photoelectrically reads an image of an original document placed upon a glass platen 26.

The reading part 3 includes the glass platen 26, a halogen lamp 9 for exposing the original document, scanning mirrors 23,24 an imaging lens 22, a blazed diffraction grating 35 for three-color separation, and a CCD 34 which is composed of monolithic 3-line sensors.

The halogen lamp 25 and the scanning mirrors 23,24 are arranged so as to perform scanning motion and moved in the sub-scanning direction at a predetermined fixed speed for scanning the original document.

An operation panel (not shown in the drawings) is provided by the glass platen 26 and the operation panel includes keys for setting many sort of operation modes of copy sequence and displays for displaying a lot of information.

Reflected light from the scanned original document passes through the lens 22 and then is separated into three primary colors by the blazed diffraction grating 35. These primary color lights are converted into electric signals by CCD 34 and the converted electric signals are subjected to various image processes.

The copying machine has an image forming part 2 which forms an image on a copying paper by using a well-known photoelectric process.

The image signals formed by the reading part 3 are supplied to a laser scanner unit 31. The laser scanner unit 31 emits a laser beam which is modulated by the image signals. The laser beam is made to irradiate the photosensitive drum 108 via fixed mirrors 32,33 whereby the image is formed. The laser scanner unit 31 is a well-known unit which includes a polyhedral mirror to reflect the laser beam.

The photosensitive drum 108 has a photosensitive layer on its surface and is rotated in the direction of arrow X.

A primary corona discharge device 107, a developer 100, a transfer charging device 106 and a cleaner 105 are provided around the photosensitive drum 108.

Copy cassettes 101,102 accommodate copy paper, a conveyor belt 103 conveying copy paper to which an image has been transferred by the transfer charging device 106 to a fixing device 21.

FIGS. 5a and 5b show the construction of CCD 34 which is composed of monolithic 3-line sensors. The line sensors 202,203,204, which are arranged in parallel on a single substrate 201, are solid-state image pick-up element arrays, each of which comprises approximately 5000 of solid-state image pick-up elements arranged in an array fashion. The line sensors 202,203,204 correspond to each of the primary colors R (red), G (green) and B (blue). The spacing 205,206 between the adjacent line sensors are decided in conformity with the angle of view.

Figure 5:
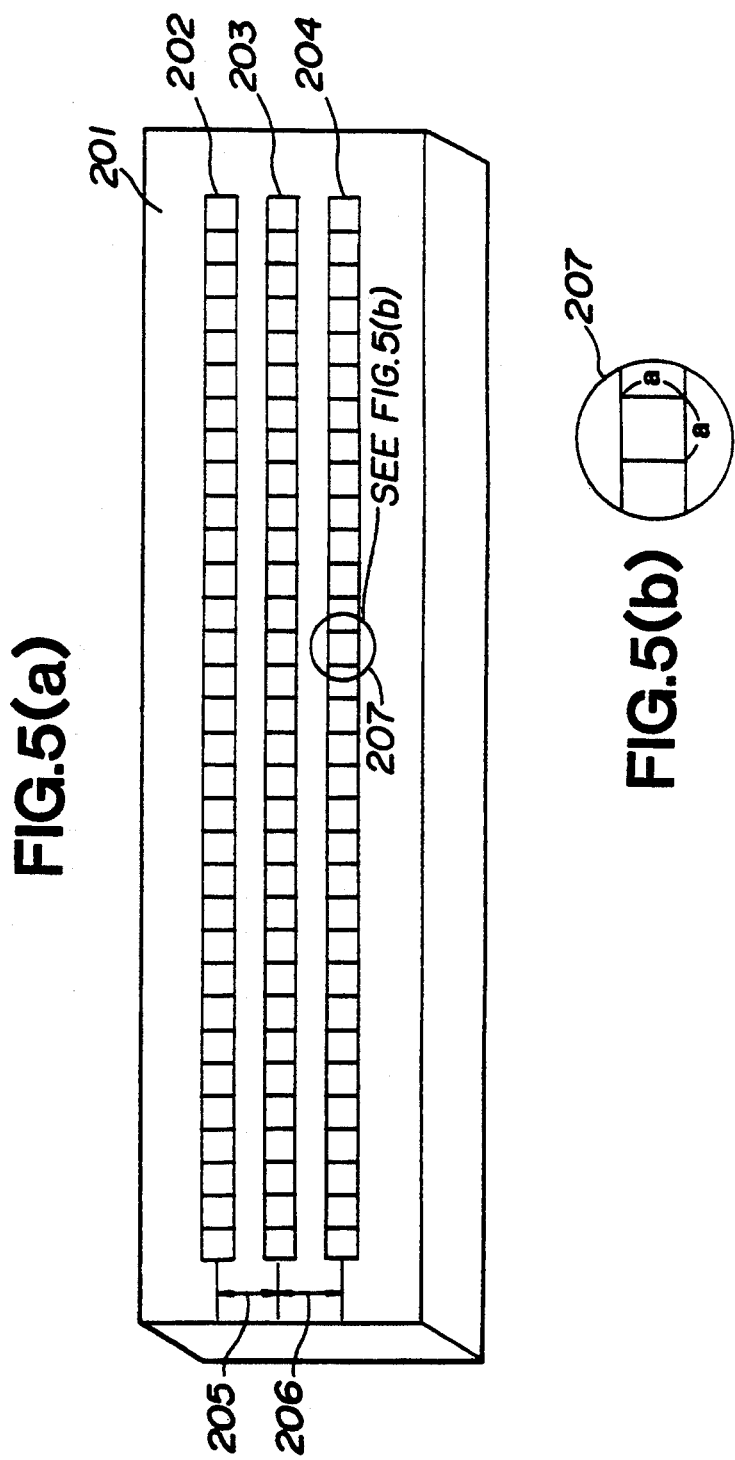

FIG. 2 shows an optical system of a color image reading apparatus which uses CCD 34 shown in FIG. 5.

An image of the original document on the glass platen 26 is scanned line by line by mirrors (not drawn) provided between the original document and the lens 22 of an optical focusing system.

Reflected light from the original document passes through the lens 22 and then is separated into three primary colors by the blazed diffraction grating 35 so as to read a color image on the original document. These primary colors lights are focused on the corresponding line sensors CCD 34 respectively.

Figure 6:
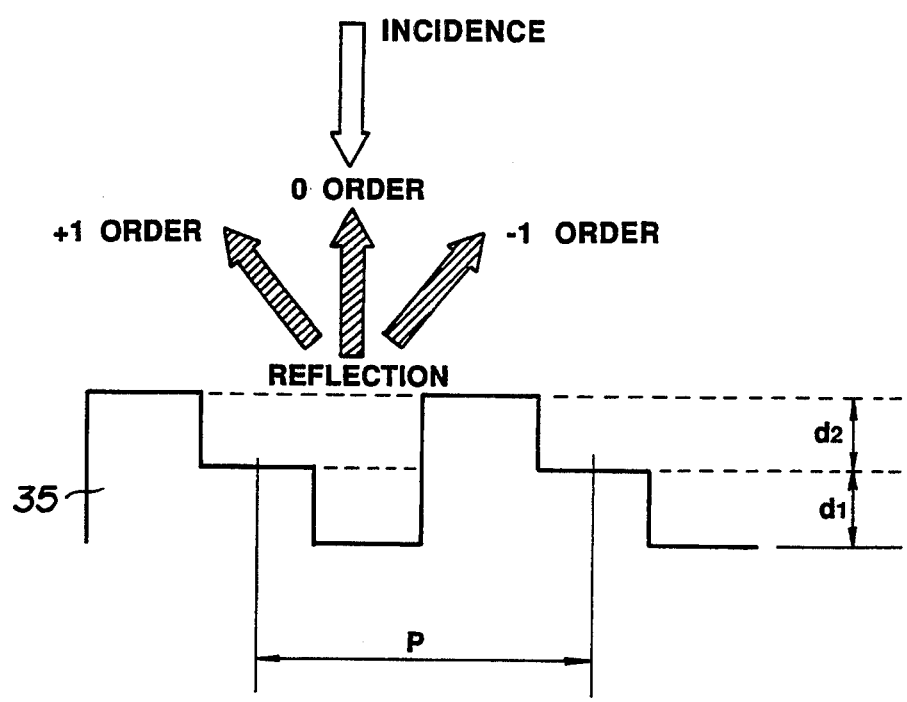
FIG. 6 is a diagram for describing the blazed diffraction grating incorporated in the machine of FIG. 4.

The general features of the three-color separating one-dimensional blazed diffraction grating 35 will now be described with reference to FIG. 6. The three-color separating one-dimensional blazed diffraction grating 35 is so structured that a step-shaped grating repeats periodically in each color-separating direction. For example, if the pitch P of the period is 60 μm, the grating thickness is 3100 μm (=d1=d2) and the refractive index of the medium is 1.5, then the incident light is transmitted and diffracted and separated into three directions, as shown in FIG. 6.

Accordingly, the reflected light from the color image of the original document is diffracted by the blazed diffraction grating 35 and three beams of light representing the three primary colors R, G, B are sent out in three different directions. In FIG. 6, the (+1) order spectrum represents the R-image, the (0) order spectrum represents the G-image and the (−1) order spectrum represents the B-image.

Figure 7:
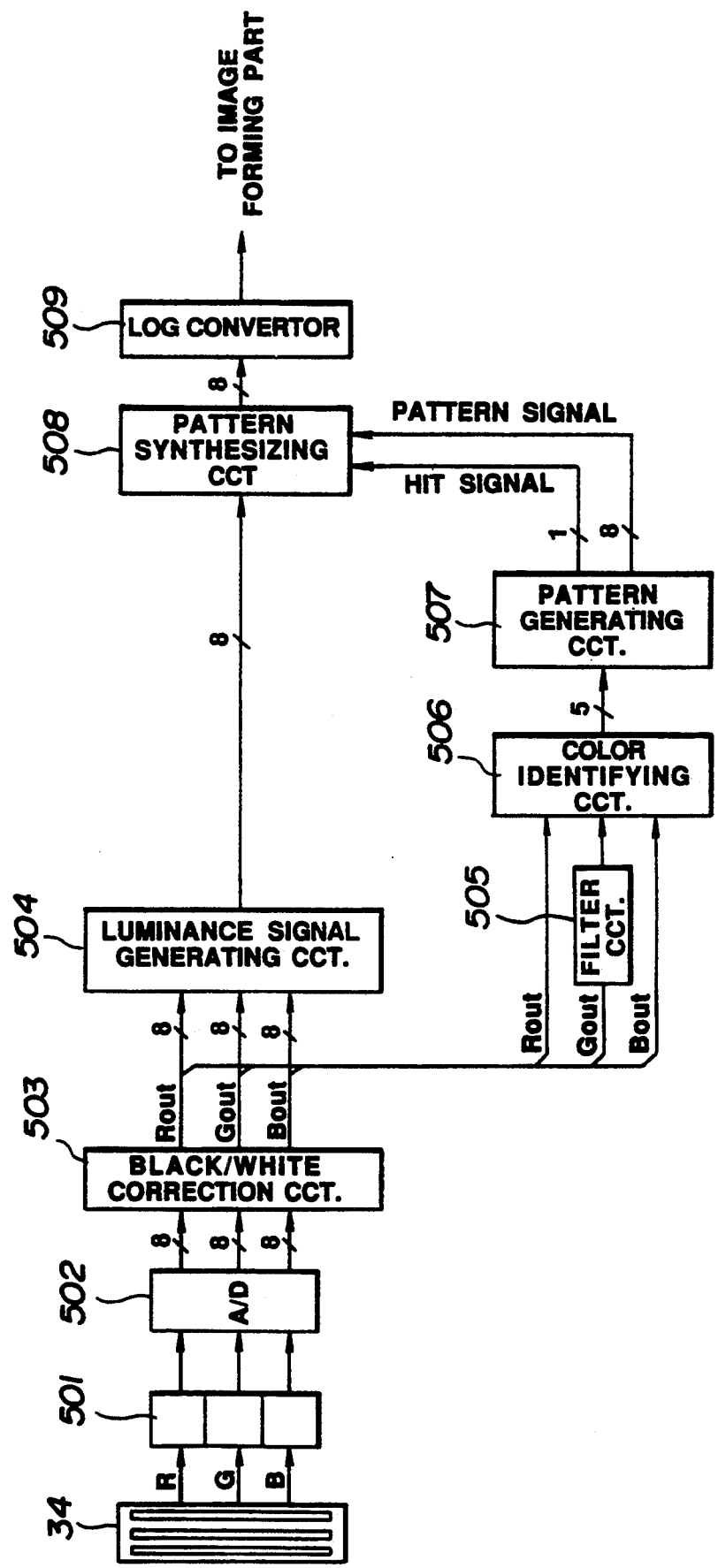
FIG. 7 is a block diagram showing the construction of an image processing circuit used by the image reading part of the machine of FIG. 4.

FIG. 7 is a block diagram of the image reading part 3 of the copying machine shown in FIG. 4.

In FIG. 7, CCD 34 converts an image of the original document focused by the optical system thereon into R, G, B image signals. An amplifier circuit 501 amplifies the output signals from CCD 34 so as to obtain analog image signals of a prescribed amplitude.

An analog-digital (A/D) converter 502 converts the amplified analog image signal into digital image data. A black level and white level correction circuit 503 subjects the digital image data to a black-level correction and a white-level correction, as further described below.

A luminance-signal generating circuit 504 generates a luminance signal from the digital image data subjected to the black-level correction and the white-level correction.

A filter circuit 505 performs a predetermined filtering operation to the G-digital image data so as to adjust the MTF of the G-digital image data to that of the R and B digital image data in the sub-scanning direction. This is necessary because the MTFs of the R and B digital image data are lower than that of the G digital image data as described above.

A color identifying circuit 506 identifies the color of each pixel of the color digital image data subjected to the black-level correction, the white-level correction and the filtering operation.

A pattern generating circuit 507 is composed of a memory device such as ROM, RAM and generates signal patterns corresponding to the color of each pixel in accordance with the identification performed by the color identifying circuit 506.

In this embodiment, the pattern generating circuit 507 reads out one of a plurality of pattern signals stored therein by using the identification signal from the color identifying circuit 506 as a read address.

A pattern synthesizing circuit 508 combines the luminance signal from the luminance signal generating circuit 504 and the pattern signal from the pattern generating circuit 507.

A LOG convertor 509 converts the output signal from the pattern synthesizing circuit 508 into a density signal and supplies the converted density signal to the image forming part 2.

The detailed construction of these circuits will now be described.

Figure 8:
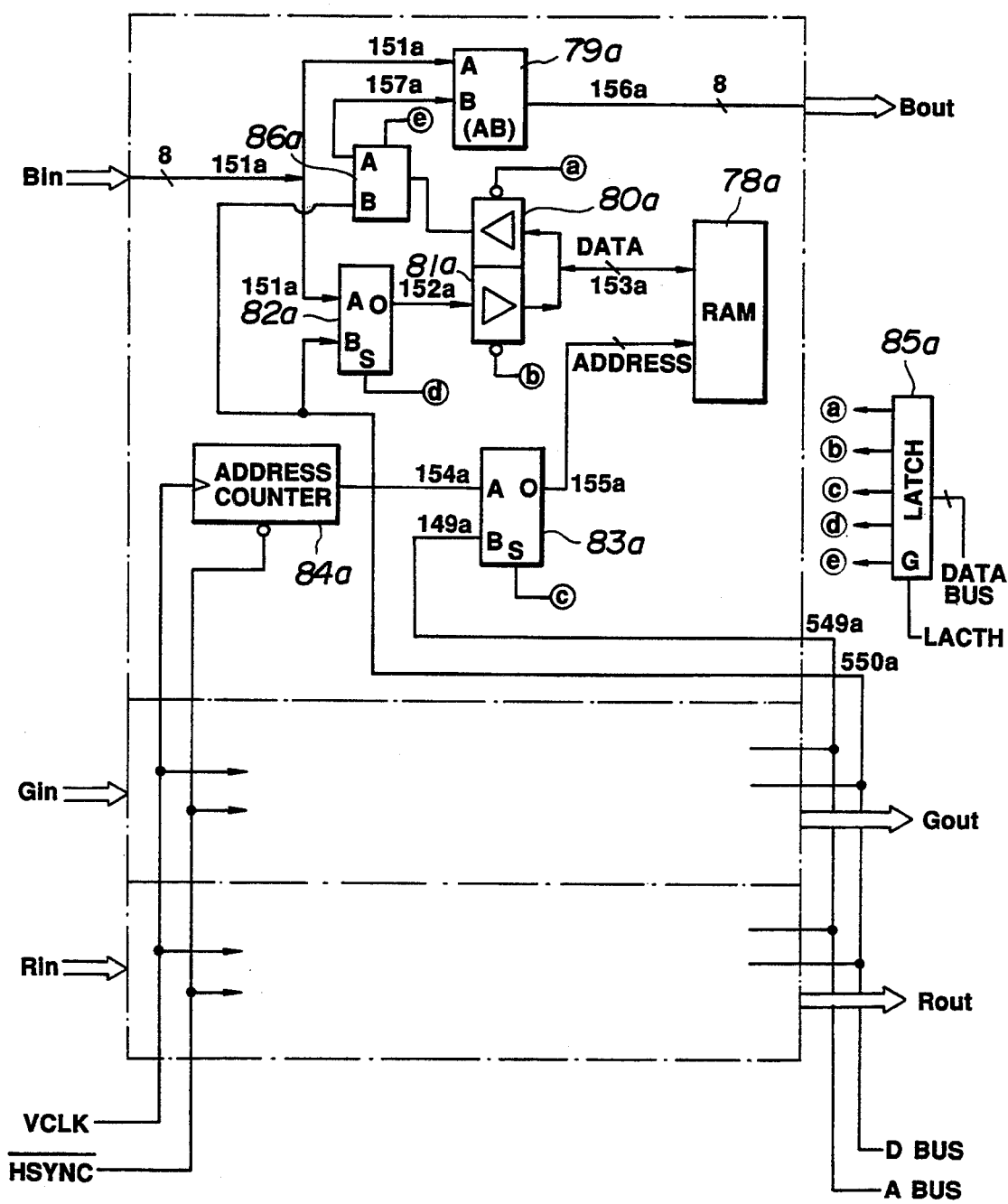
FIG. 8 is a block diagram showing the construction of a black correction circuit used in the circuit of FIG. 7.

FIG. 8 is a block diagram showing the construction of a black correction circuit in the black-level and white-level correction circuit 503 shown in FIG. 7.

The digital image data obtained from CCD 34 upon being A/D conversion exhibits a large disparity between pixels when the quantity of light which enters CCD 34 is very small as shown in FIG. 9. If this data were to be output in the form of an image, streaks or irregularities would develop in the image thus formed. Accordingly, it is necessary to correct for the disparities in the output of the black portion. The correction is made by the circuit shown in FIG. 8. Identical circuits are provided to correct for each of R, G, B digital image data.

Prior to the reading of the original document, the original scanning unit including the halogen lamp 25 and the scanning mirrors 23,24 is moved up to a black-color board 27. The black-color board 27 possesses .average density and it is provided in a non-image area .at the leading edge of the glass platen 26.

The lamp 25 is then turned on and the black-color board 27 is read by CCD 34. Accordingly, image data indicative of the black level is output from CCD 34 and is input to the black correction circuit. With regard to blue image data Bin, the A input of a selector 82a is selected, a gate 80a is closed and a gate 81a is opened in order to store one line of the image data in a black-level RAM 78a. Namely, the data line is connected in the manner 151a→152a→153a.

Meanwhile, the A input of a selector 83a is selected so that the output 84a of an address counter 154a, which is initialised by horizontal synchronising signal (HSYNC) and counts a video clock (VCLK), will enter an address input 155a of the RAM 78a. As a result, one line of the black level data is stored in the RAM 78a as black reference data. (The foregoing mode of operation is referred to as black reference-value reading mode.)

Thus, when an image of the original document is actually read, the RAM 78a assumes a data read-out mode and the black reference data is read out and input to the B input of a subtractor 79a every line and every pixel via a path composed of data lines 153a→157a. That is, the gate 81a is closed and the gate 80a is opened at this time. In addition, a selector 86a delivers an A output.

Accordingly, an output 156a from the black correcting circuit is obtained as Bout(i)=Bin(i)−DK(i) with respect to the black reference data DK(i) in case of blue image data. (This mode is referred to as the black correction mode.) Similarly, green image data Gin and red image data Rin are corrected in the same manner respectively.

In order to execute control, control lines a, b, c, d, e of each selector or gate are placed under the control of CPU (not shown in drawings) by a latch 85a assigned as the I/O of the CPU. By selecting the B inputs of the selectors 82,83a and the B output of the selector 86a, the RAM 78a can be accessed by the CPU.

Figure 10:
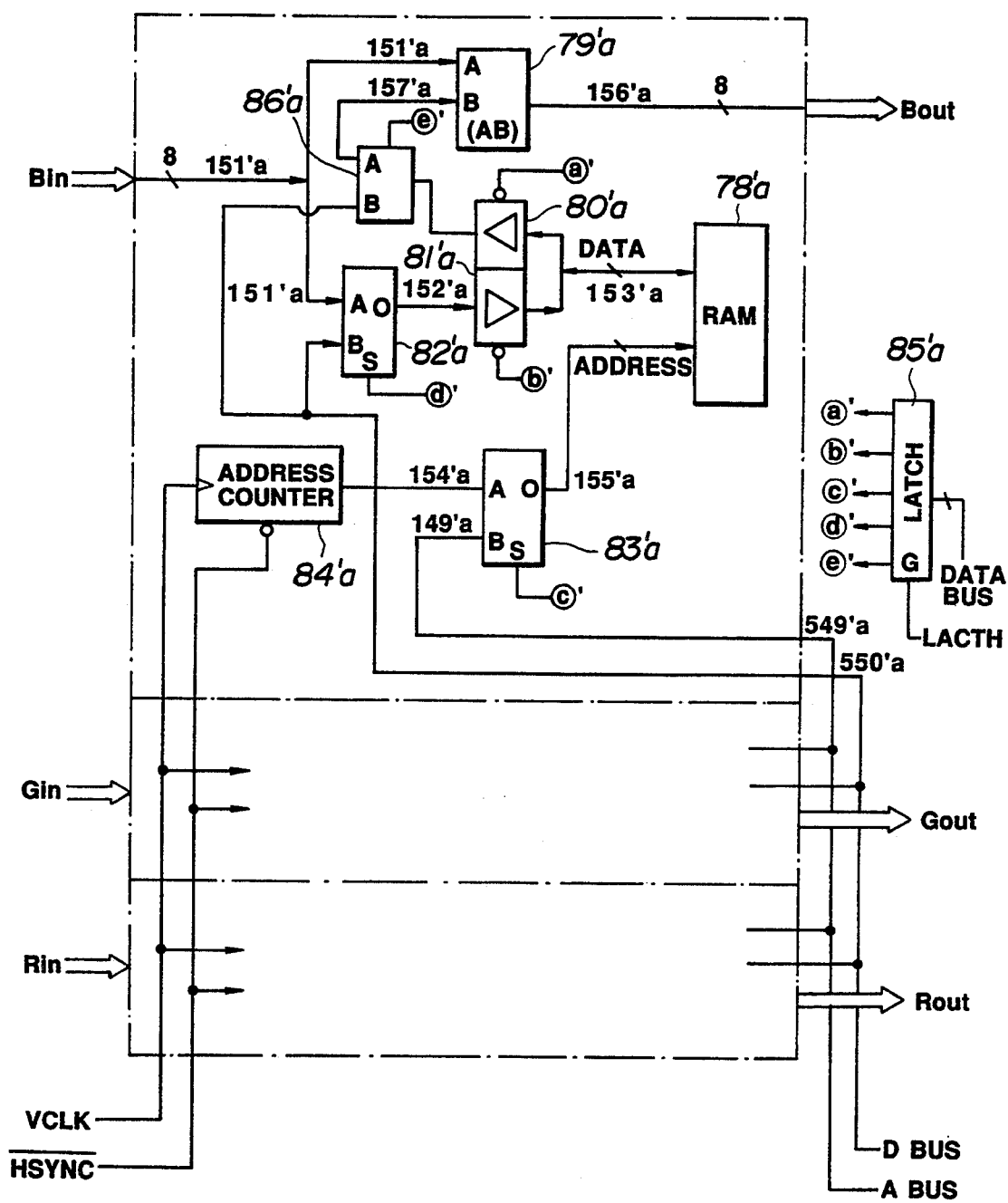
FIG. 10 is a block diagram showing the construction of a white correction circuit used in the circuit of FIG. 7.

FIG. 10 is a block diagram showing the construction of the white correcting circuit in the black-level and white-level correction circuit 503 shown in FIG. 7.

By the white level correction (shading correction operation), the deviation of the output from CCD 34, which is caused by the characteristics of the lamp, lenses or CCD, will be corrected on the basis of white reference data which is output from CCD 34 when the original scanning unit is moved up to a white-color board 28 and the white-color board 28 is illuminated by the lamp 25.

The construction of the white correcting circuit is almost the same as that of the black correcting circuit. However, the white correcting circuit comprises a multiplier 79'a instead of the subtractor 79a of the black correcting circuit.

When CCD 34 is at the reading position (home position) of a uniform white-color board 28 (i.e, prior to a copying operation or reading operation), the lamp 25 is turned on and one line of image data of a uniform white level, which is outputted from CCD 34, is stored in a white-level RAM 78'a as white reference data.

If the main scanning direction covers the length of an A4 size of paper, then the capacity of the RAM 78'a that will be required is 4752 (=16×297 mm) pixels at 16 pel/mm, i.e, at least 4752 bytes. Namely, if white reference data of pixel (i) is represented by W(i) as shown in FIG. 11, the RAM 78'a will store white reference data of each pixel as shown in FIG. 12.

The corrected image data Do(i) with respect to the read data D(i) will be represented as follows:

$$Do(i)=D(i) \times FFH/W(i)$$

Accordingly, CPU outputs latch data a', b', c', d' to the latch 85' in order to open the gate 80'a, 81'a, select B inputs of the selectors 82'a,83'a and select B output of the selector 86'a. That is, CPU can access the content of the RAM 78'a.

Figure 13:
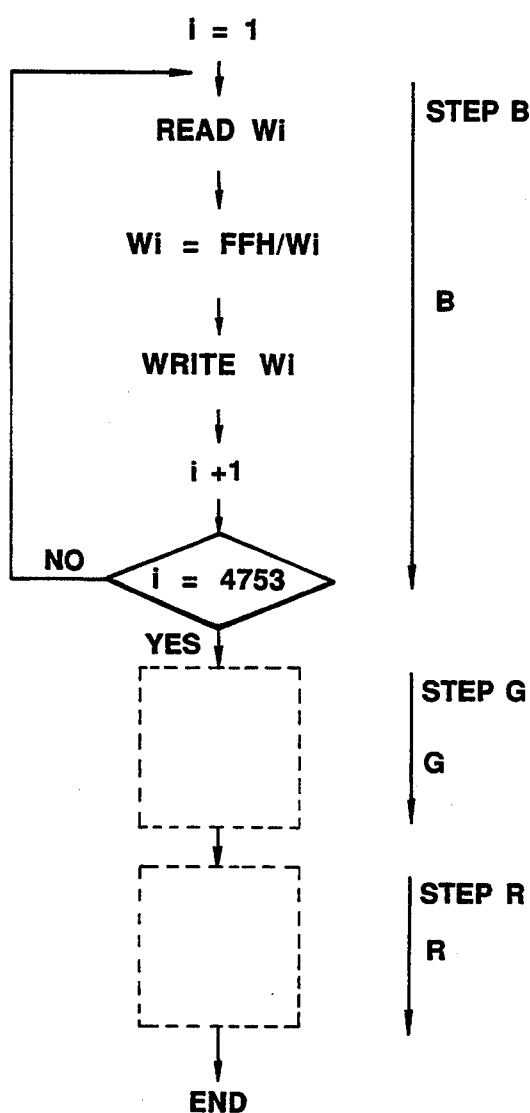
FIG. 13 is a flowchart for describing a white level correction.

The CPU successively performs the operations FFH/W(1), FFH/W(2), ..., FFH/W(i), ... with respect to W(1), W(2), W(i), ... stored in the RAM 78'a and stores data obtained by the above operations in the RAM 78'a instead of white reference data W(1) ... W(i) ..., respectively, as shown in FIG. 13.

After the above operation with respect to blue component (Step B) is completed, the similar operations with respect to green component and red component (Step G, Step R) will be performed sequentially.

After that, the gate 80'a is opened, the gate 81'a is closed, the A input of the selector 83'a is selected and the A output of the selector 86'a is selected in order to output the corrected image data Do(i) with respect to the read data D(i). Namely, the data FFH/W(i) is read out from the RAM 78'a and supplied to the multiplier 79'a via data lines 153'a-157'a. Thereby, the data FFH/W(i) is multiplied by the original image data D(i) 151'a inputted to the other terminal of the multiplier 79'a. As a result, the output of the multiplier 79'a becomes the corrected image data Do(i).

As described above, the deviation of black and white levels, being caused by unevennesses of black sensitivity of an input system, dark current of CCD, output of each photodiode of CCD, intensity of lump or white sensitivity etc is corrected by the black correcting circuit and the white correcting circuit. Thereby, image data (Bout, Gout, Rout) being subjected to the black level correction and the white level correction can be obtained.

The 8-bit of image data thus corrected (i.e Rout, Gout, Bout) is supplied to the luminance signal generating circuit 504, the color identifying circuit 506 and the filter circuit 505.

Figure 14:
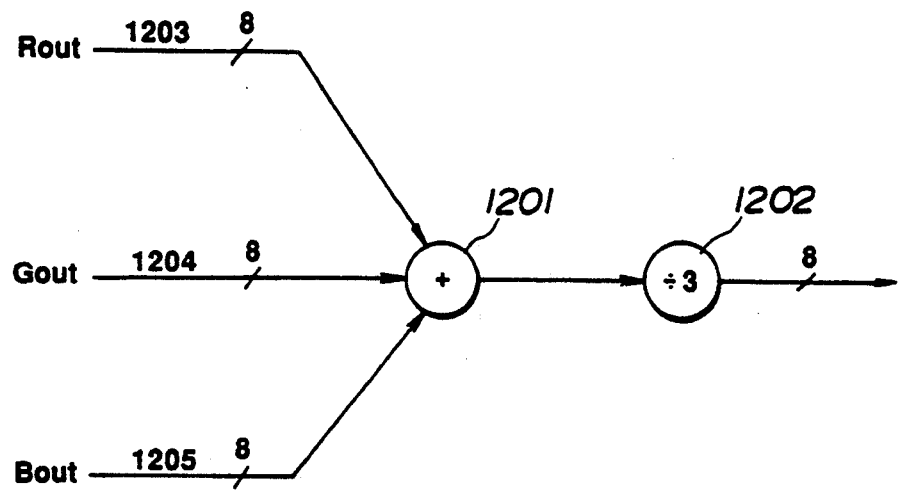
FIG. 14 is a block diagram showing the construction of a luminance-signal generating circuit incorporated in the circuit of FIG. 7.

FIG. 14 shows the construction of the luminance-signal generating circuit 504.

The luminance signal generating circuit 504 generates image data representing an image which includes all wavelength on the basis of the color separated image obtained by reading the original document by CCD34. Namely, image data representing monochrome image is generated, because the image forming part 2 has a function of forming a monochrome image only. The following operation is performed at the luminance signal generating circuit 504.

$$Data=(Rout+Gout+Bout)/3$$

As above operation, a mean value of the three color image data (Rout, Gout, Bout) is obtained. In this embodiment, an adder 1201 and a multiplier 1202 are used for the above operation. The luminance signal thus produced is supplied to the pattern synthesising circuit 508 as described below.

The luminance signal generating circuit 504 comprises some delay circuits (not shown in FIG. 14) which delay the output of the luminance signal to the pattern synthesising circuit 508 so as to correspond to the process speeds of the filter circuit 505, the color identifying circuit 506 and the pattern generating circuit 507.

The filter circuit 505 will now be described with reference to FIG. 15.

The G-image data Gout, which has been subjected to the black level correction and the white level correction by the black-level and white-level correction circuit 503, is supplied to the filter circuit 505. As described above, the MTF of the G-image data Gout is higher than the MTFs of the R-image data Rout and the B-image data Bout in the sub-scanning direction.

Figure 15A:
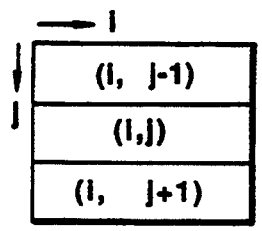
FIGS. 15a and 15b are block diagrams showing the construction of a filter circuit used in the circuit of FIG. 7.

In this embodiment, the filter circuit 505 adopts a spacial filter which obtains the mean value of density values of pixels included in 1×3 area shown in FIG. 15(a). An input image is assumed g(i,j), the spacial filter is assumed M(i,j) and an output image is assumed f(i,j). The output image f(i,j) will be expressed by the following equation.

$$f(i,j) = g(i,j) * M(i,j)$$

Wherein, the spacial filter M(i,j) is represented as follows:

$$M(i,j) = \frac{1}{3} \begin{matrix} 1 \\ 1 \\ 1 \end{matrix}$$

Accordingly, the filter circuit 505 having the above spacial filter generates the mean value of the density values of three consecutive pixels with regard to the sub-scanning direction as the image data of the center pixel.

Figure 15B:
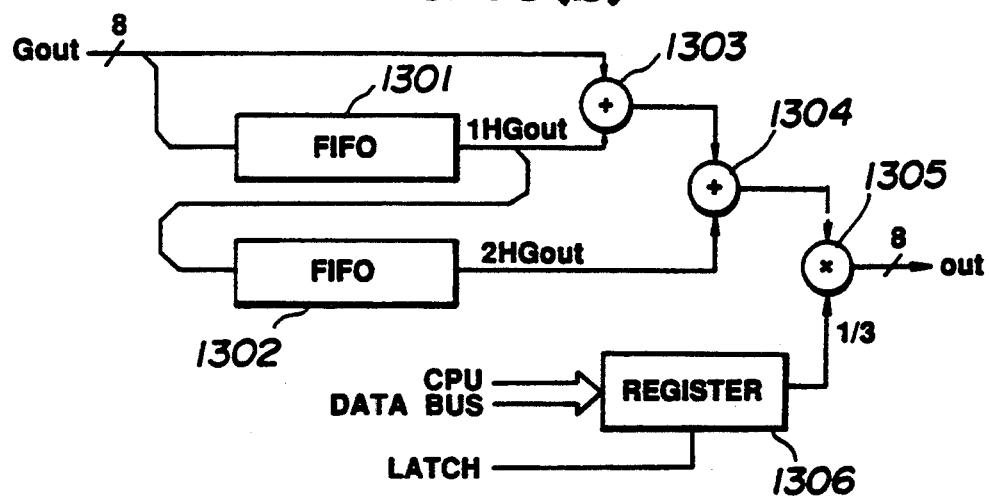

FIG. 15(b) is a block diagram showing the construction of the filter circuit 505. FIFOs 1301,1302 delay the G-image data by one scanning period (1H), respectively. An adder 1303 adds the inputted G-image data Gout and the delayed G-image data 1HGout. An adder 1304 adds the output of the adder 1303 and the delayed G-image data 2HGout.

The output of the adder 1304, that is, the adding result of the inputted G-image data Gout, the delayed G-image data 1HGout and the delayed G-image data 2HGout, is supplied to a multiplier 1305. The multiplier 1305 multiplies the output of the adder 1304 by 1/3 which has been set at a register 1306 by CPU via data bus as a parameter.

Thereby, the smoothing process is performed on the G-image data and the unevenness of the MTF among the three color image data can be corrected. The G-image data subjected to the above filtering process is supplied to the color identifying circuit 506 together with the R-image data Rout and the B-image data Bout. Some delay circuits (not shown in drawings) are provided for delaying the R-image data Rout and the B-image data Bout so as to correspond to the process speed of the filter circuit 505 in order to supply the three color image data representing an identical pixel to the color identifying circuit 506 at the same time.

Figure 16:
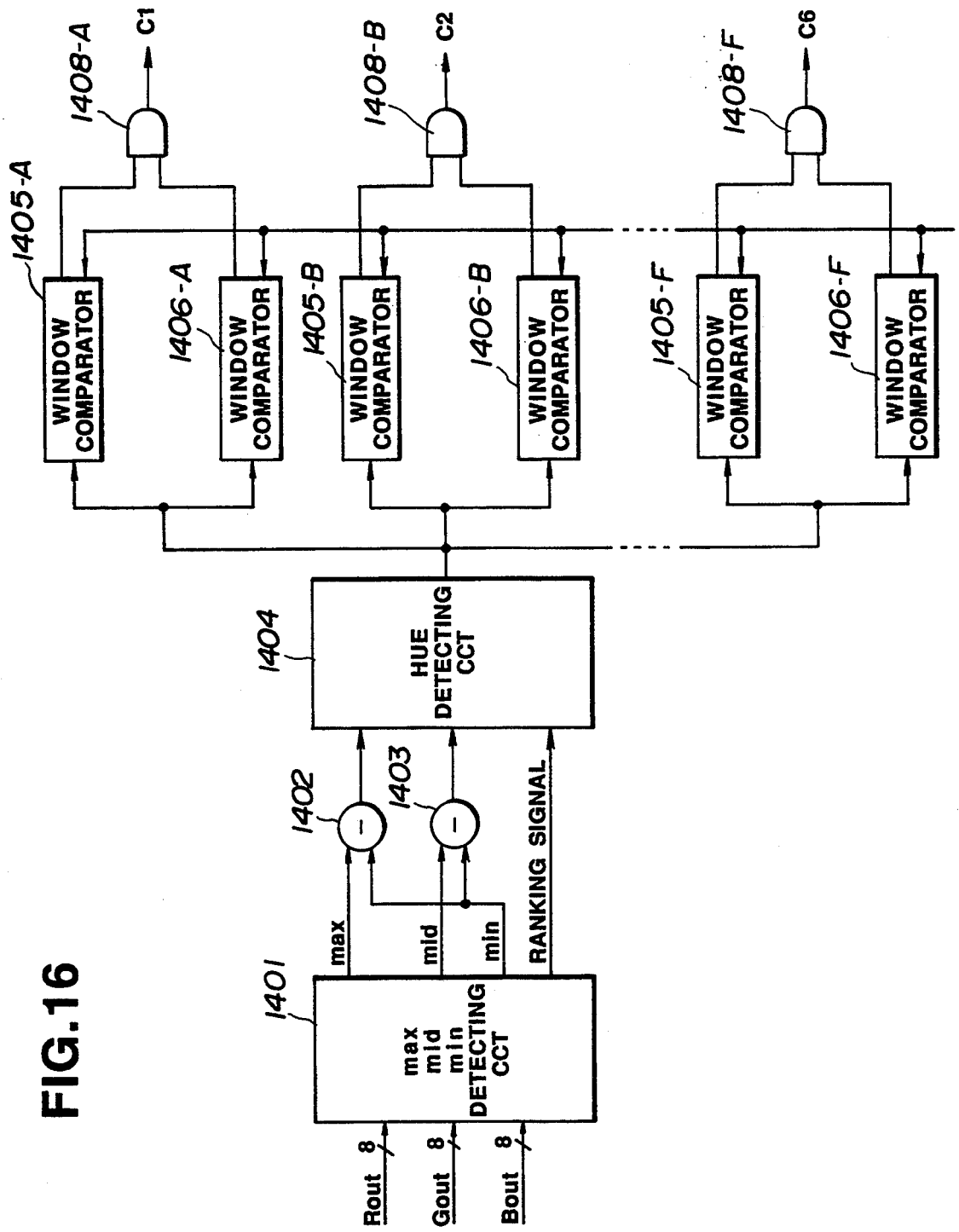
FIG. 16 is a block diagram showing the construction of a color identifying circuit used in the circuit of FIG. 7.

FIG. 16 is a block diagram showing the construction of the color identifying circuit 506.

The three color image data supplied to the luminance signal generating circuit 504 is also supplied to the color identifying circuit 506 after the G-image data Gout has been subjected to the filtering process at the filter circuit 505. In this embodiment, a hue signal is used in the color identifying method. The reason for this is that accurate judgments can be made even in a case where color is the same but vividness and brightness differ. The general features of the color identifying method will be described first.

The input R-image data Rout, G-image data Gout and B-image data Bout each consist of eight bits and therefore possess information indicative of a total of $2^{24}$ colors. Consequently, using such a massive amount of information would be extremely costly in terms of the scale of the circuitry.

In this embodiment, the above-mentioned hues are used for identifying colors. Strictly speaking, these hues differ from those expressed ordinarily but shall be referred to as hues here just the same. It is known that color space is expressed by saturation, luminosity and hue, as is known in a Munsell color solid or the like. It is necessary to convert the R,G,B image data into a plane, i.e two dimensional data. Since the portions that R,G,B have in common, namely the minimum values Min(R,G,B) of R,G,B image data are achromatic components, Min(R,G,B) is subtracted from each of the R,G,B image data and the remaining information is used as the chromatic components, whereby the three dimensional input color space is converted into two dimensional color space.

Figure 17:
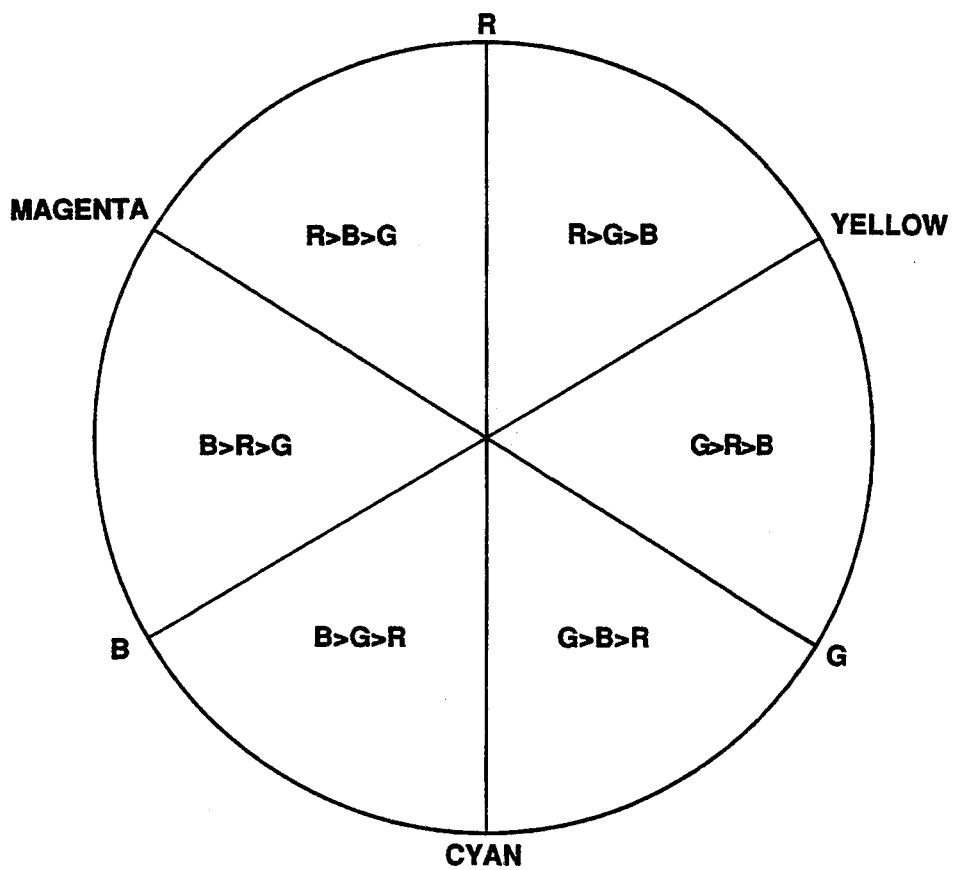
FIG. 17 is a diagram for describing a two-dimensional color space.

FIG. 17 shows the two dimensional color space obtained by the above method. The two dimensional color space is divided into six portions corresponding to the order of magnitudes of the R,G,B image data, namely R>G>B, R>B>G, G>B>R, G>R>B, B>G>R, B>R>G. Accordingly, the hue values can be obtained using a LUT (look-up table) or the like in accordance with a ranking signal representing the order of magnitudes of the input R,G,B image data and the maximum value Max and the intermediate value Mid among the input R,G,B image data.

The operation of the color identifying circuit 506 will now be described.

The R,G,B image data Rout, Gout, Bout are inputted in a max-mid-min detecting circuit 1401, which discriminates the magnitudes of the R,G,B image data. The detecting circuit 1401 compares the R,G,B image data using a comparator and outputs a maximum value Max, an intermediate value Mid and a minimum value Min in accordance with the comparison result.

The detecting circuit 1401 also outputs the ranking signal representing the order of the magnitudes of the R,G,B image data in accordance with the comparison result.

Since the achromatic components are subtracted from the maximum value and the intermediate value, as described above, the minimum value Min is subtracted from the maximum value Max and the intermediate value Mid by subtractors 1402,1403 respectively.

The outputs of the subtractors 1402,1403 are supplied to a hue detecting circuit 1404 along with the ranking signal. The hue detecting circuit 1404 is composed of a memory device which is randomly accessible, such as RAM or ROM. In this embodiment, the hue detecting circuit 1404 is a look-up table using a ROM. Values corresponding to the angle of the plane shown in FIG. 17 are stored in the ROM in advance. The ROM outputs the value in response to the ranking signal, (Max-Min) value and (Mid-Min) value, as hue data.

The output hue data is inputted to six pairs of window comparators 1405,1406. Values, which define a predetermined range including a hue value corresponding to a color designated by an operator using a data input means as a color to be converted into a pattern, have been set in each pair of the window comparators 1405,1406 by CPU. Namely, if the hue value corresponding to a color to be converted into a pattern is Ao, value A1 ($=Ao+\alpha$) and value A2 ($=Ao-\beta$) are set in the comparators 1405,1406 respectively. (Wherein A1>Ao>A2)

If the value set in the comparator 1405-A is A1, the comparator 1405-A will output "1" when the hue data from the hue detecting circuit 1404 is less than value A1. If the value set in the comparator 1406-A is A2, the comparator 1406-A will output "1" when the hue details are more than A2. As a result, an AND gate 1408-A outputs "1" when A1>hue data>A2 holds, and the color identifying circuit 506 outputs a color identifying signal C1.

In FIG. 16, since six pairs of window comparators are provided, the desired six colors can be identified by setting mutually different values in each pair of window comparators. Accordingly, the six AND gates 1408A-F can output six color identifying signals C1-C6 each representing mutually different hues. These color identifying signals are supplied to the pattern generating circuit 507.

Figure 18:
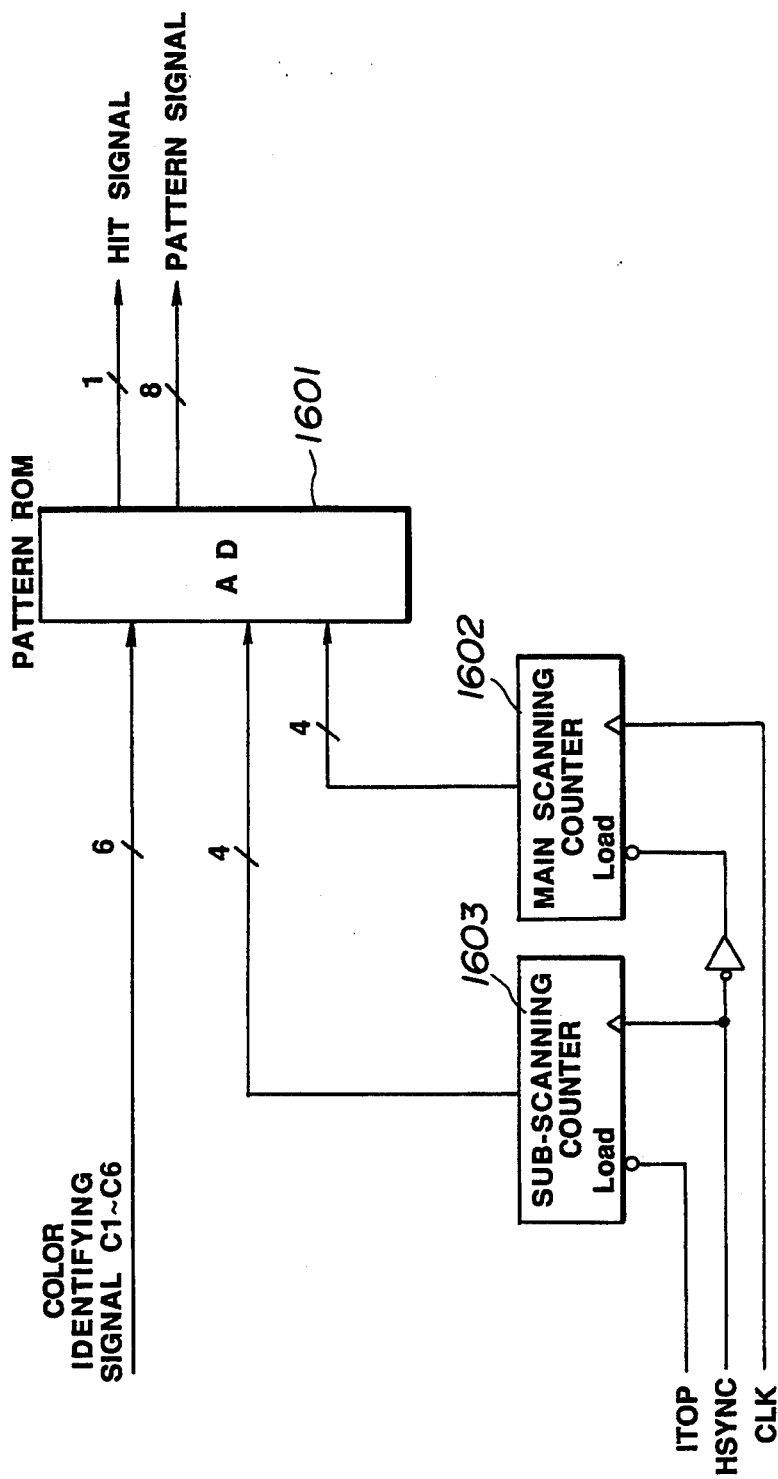
FIG. 18 is a block diagram showing the construction of a pattern generating circuit used in the circuit of FIG. 7.

The pattern generating circuit 507 will now be described with reference to FIG. 18.

Dot patterns corresponding to the six hues C1-C6 shown in FIG. 19 are written in a pattern ROM 1601 in advance. The pattern of each figure consists of pattern data of 16 × 16 dots. The pattern ROM 1601 generates patterns by the repeatedly outputting patterns corresponding each hue represented by the color identifying signals C1-C6.

A main scanning counter 1602 is loaded to an initial value by a horizontal synchronizing signal HSYNC and counts a video clock CLK so as to generate addresses in the main scanning direction. A sub-scanning counter 1603 is loaded to an initial value by an image top signal ITOP and counts a horizontal synchronizing signal HSYNC so as to generate addresses in the sub-scanning direction.

The outputs of the counters 1602,1603 each consist of four bits, and the color identifying signal C1-C6 consists of six bits. Thus, data consisting of a toal of 14 bits are supplied to the pattern ROM 1601 as an address. Namely, the arrangement is such that six patterns each consisting of 16×16 can be selectively generated corresponding to read colors.

The output from the pattern ROM 1601 has a data length of eight bits, in which the MSB (the most significant bit) is used as the control signal (HIT signal) within the pattern synthesising circuit 508, described later. The data is written in the pattern ROM 1601 so that the MSB is usually "0", but always becomes "1" when a pattern is generated.

It should be noted that the pattern ROM 1601 may be substituted by a RAM or the like. If a RAM or the like is used, the capacity thereof and the bit assignment of the address are the same as in the case of the ROM.

Figure 20:
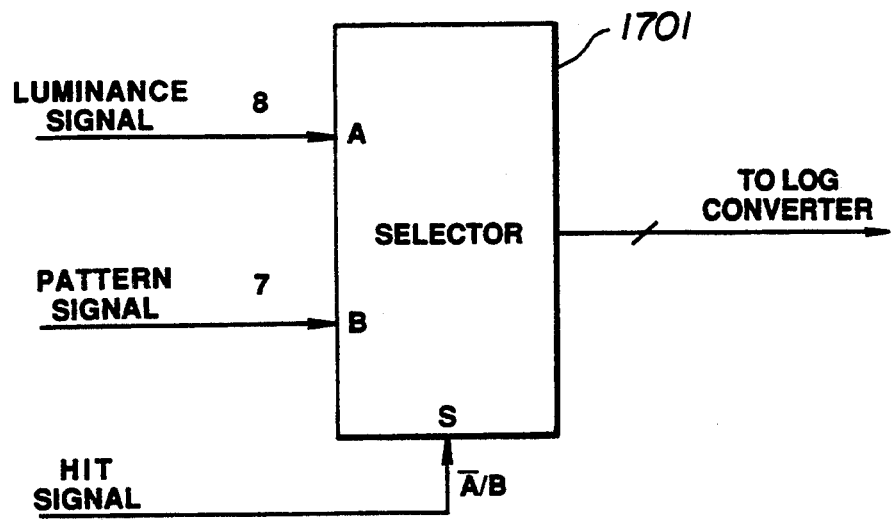
FIG. 20 is a block diagram showing the construction of a pattern synthesizing circuit used in the circuit of FIG. 7.

The construction of the pattern synthesising circuit 508 will now be described with reference to FIG. 20.

The luminance signal from the luminance signal generating circuit 504 is applied to the terminal A of a selector 1701. The pattern signal from the pattern generating circuit 507 is applied to the terminal B of the selector 1701. The HIT signal is applied to the terminal S of the selector 1701.

The selector 1701 selects and outputs the luminance signal when the HIT signal is "0", and the selector 1701 selects and outputs the pattern signal when the HIT signal is "1".

As a result, the pattern signal can be outputted instead of the luminance signal when the color identifying circuit 506 identifies that the input image is a chromatic image.

Image data, synthesised in such a manner that the pattern signal is output for an image area in which the HIT signal is output and the luminance signal is output for an area in which the HIT signal is not output, is converted to density signal by the log convertor 509. This log conversion is made by using a look-up table written in a ROM consisted in the log conversion circuit 509.

The converted density signal is supplied to the image forming part 2 which forms an image on the basis of the density signal.

As explained above, the deterioration of the MTF of the green image data, which is caused by the arrangement of the one dimensional blazed diffraction grating 35 and CCD 34, is less than those of the red and blue image data. In this embodiment, the green image data is subjected to the smoothing process by the filtering circuit 505 so as to adapt the MTF of the green image data to those of the red and blue image data. Accordingly, the color identifying operation using the three color image data can be accurately performed. For example, in order to convert chromatic image into a pattern, it can be arranged that the black image is prevented from being converted into a pattern.

Figure 21:
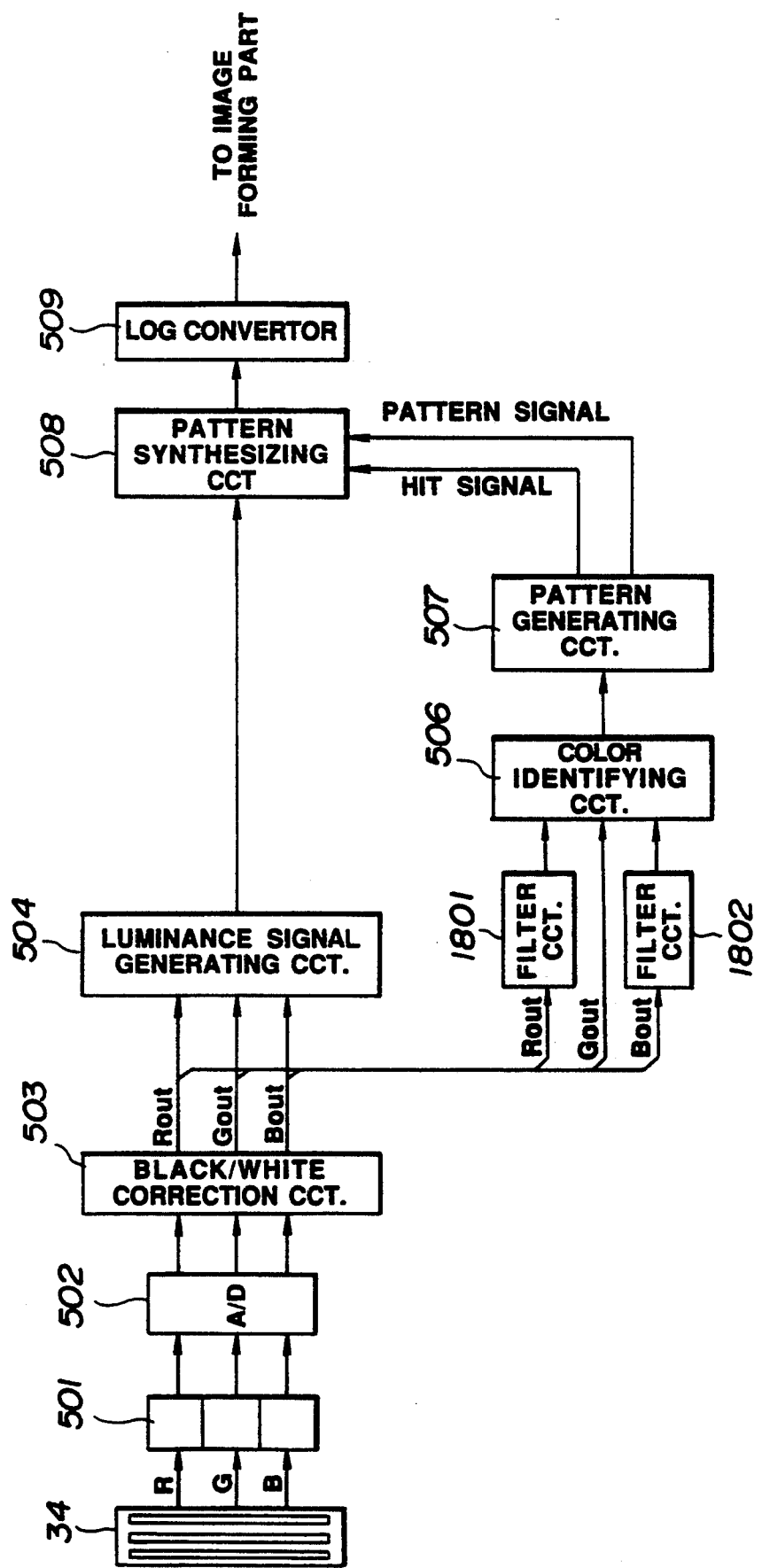
FIG. 21 is a block diagram showing another construction of an image processing circuit in accordance with an embodiment of the invention.

FIG. 21 is a construction of a second embodiment according to the present invention.

The construction shown in FIG. 21 is almost the same as that shown in FIG. 7. However, in FIG. 21 filter circuits 1801, 1802 are provided between the black level/white level correction circuit 504 and the color identifying circuit 506, instead of the filter circuit 505 for filtering the G-image data Gout in FIG. 7.

Figure 22A:
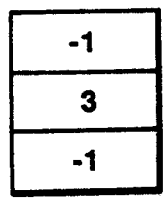
FIGS. 22a and 22b are block diagrams showing the construction of an edge emphasizing filter circuit.

In FIG. 21, the filter circuits 1801, 1802 filter the R-image data Rout and B-image data Bout, of which MTFs are lower than that of the G-image data, respectively. So the filter circuit 1801,1802 are not smoothing filters, but edge emphasising filters having parameters as shown in FIG. 22($a$).

Figure 22B:
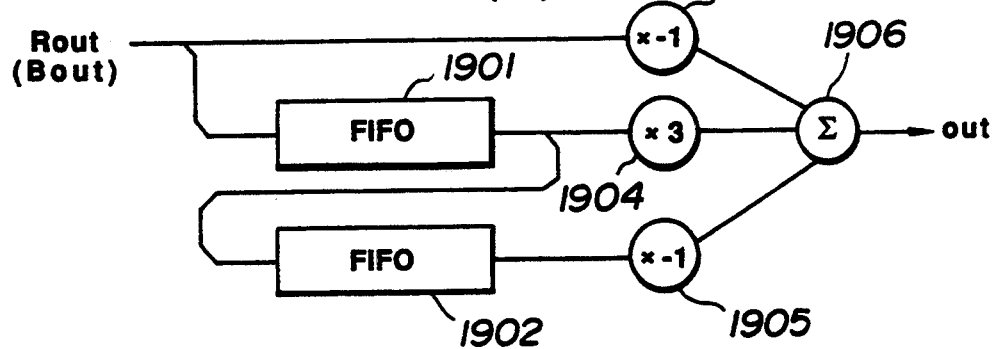

FIG. 22($b$) is a block diagram showing the construction of the edge emphasising filter circuits 1801,1802. FIFOs 1901,1902 delay the image data by one scanning period (1H) respectively. A multiplier 1903 multiplies the input image data by $-1$ (the multiplier 1903 is actually composed of an invertor circuit). A multiplier 1904 multiplies the output of the FIFO 1901 by 3. A multiplier 1905 multiplies the output of the FIFO 1902 by $-1$. An adder 1906 adds the outputs of the multipliers 1903,1904,1905.

According to this embodiment, the red image data and blue image data, of which the deteriorations of the MTF, which is caused by the arrangement of the one dimensional blazed diffraction grating 35 and CCD 36, are greater than that of the green image data, are subjected to the edge emphasising process. Thereby, the MTFs of the red image data and blue image data can be improved so as to adopt the MTFs of the red and blue image data to that of the green image data.

FIG. 23 is a construction of a third embodiment according to the present invention.

The construction shown in FIG. 23 is almost the same as that shown in FIG. 7. However, in FIG. 23, edge emphasising filter circuits 2001,2002 and a smoothing filter circuit 2003 are provided between the black level/white level correction circuit 503 and the color identifying circuit 506. The red and blue image data, of which the MTFs are lower than that of the green image data, are subjected to the edge emphasising process using the parameters shown in FIG. 22(a) so as to emphasise the edge part of a line image along the main scanning direction. The green image data is subjected to the smoothing process using parameters described later so as to smooth the line image. Thereby, the unevenness of the MTF among the three color image data can be corrected.

The spacial filter of the smoothing filter circuit 2002 is different from that of the filter circuit 505 shown in FIG. 7. The parameter of the spacial filter of the smoothing filter circuit 2002 decreases, as the distance from the notice pixel increases and is represented as follows:

$$M(i,j) = \frac{1}{4} \begin{matrix} 1 \\ 1 \\ 1 \end{matrix}$$

By using the above parameter, the deterioration of sharpness which is caused by the smoothing process can be prevented.

As described above, in the construction that uses a CCD consisting of monolithic 3-line sensors and a one dimensional blazed diffraction grating, the spacial filter for correcting the MTF of the image data with regard to the sub-scanning direction is provided for at least one line sensor. Accordingly, the color image on the original document can be accurately read, and the black line or black letter can be precisely read as black image.

For example, the error in identifying color can be prevented when the color process, such as the color pattern conversion process or the black letter extraction process, is performed.

In the above embodiments, the unevenness of MTF among the outputs of line sensors is corrected by the smoothing process or edge emphasising process, but parameters of these processes may be changed to obtain suitable image signals.

It will be appreciated that the diffraction grating may be effective to produce a plurality of light beams in which each beam may include light of more than one color.

The present invention was explained above in reference to some preferred embodiments, but needless to say, the present invention is not limited to the embodiments but various modifications and changes are possible.

What I claim is:

1. A color image reading apparatus, comprising:
   an optical device for diffracting light from a color image and sending out in different directions a plurality of beams of light, each beam representing at least one of a plurality of different colors;
   a plurality of line sensors for respectively receiving at least one of the plurality of beams of light and for converting received beams into electrical image signals; and
   correction means for correcting relative variations among the image signals from said plurality of line sensors caused by said optical device for diffracting light, and for outputting corrected image signals.

2. An apparatus according to claim 1, wherein said optical device comprises a one dimensional blazed diffraction grating.

3. An apparatus according to claim 1, wherein said plurality of line sensors are arranged on a single substrate.

4. An apparatus according to claim 1, wherein said correction means comprises filter means for performing a filter process on the image signals from at least one of said plurality of line sensors.

5. An apparatus according to claim 4, wherein said filter means comprises means for performing a smoothing process on the image signals.

6. An apparatus according to claim 4, wherein said filter means comprises means for performing an edge emphasizing process on the image signals.

7. An apparatus according to claim 1, further comprising identifying means for identifying a color of the color image on the basis of the corrected image signals.

8. An apparatus according to claim 7, wherein said identifying means comprises means for identifying whether the image is achromatic or not.

9. A color image reading apparatus, comprising:
   an optical device for diffracting light from a color image and sending out in different directions a plurality of beams of light, each beam representing at least one of a plurality of different colors;
   a plurality of sensors for respectively receiving at least one of the plurality of beams of light and for converting received beams into electrical image signals; and
   filter means for performing a filtering process on the image signals from at least one of said plurality of line sensors, to compensate for relative variations among image signals from different line sensors caused by said optical device, and for outputting filtered image signals.

10. An apparatus according to claim 9, wherein said optical device comprises a one dimensional blazed diffraction grating.

11. An apparatus according to claim 9, wherein said plurality of line sensors are arranged on a single substrate.

12. An apparatus according to claim 9, wherein said filter means comprises means for performing a smoothing process on the image signals.

13. An apparatus according to claim 9, wherein said filter means comprises means for performing an edge emphasising process on the image signals.

14. An apparatus according to claim 9, further comprising identifying means for identifying a color of the color image on the basis of the filtered image signals.

15. An apparatus according to claim 14, wherein said identifying means comprises means for identifying whether the image is achromatic or not.

* * * * *

UNITED STATES PATENT AND TRADEMARK OFFICE
CERTIFICATE OF CORRECTION

PATENT NO. : 5,361,145

DATED : November 1, 1994

INVENTOR : SHIZUO HASEGAWA

It is certified that error appears in the above-identified patent and that said Letters Patent is hereby corrected as shown below:

IN THE DRAWINGS

SHEET 8 OF 19

FIG. 8, "LACTH" should read --LATCH--.

SHEET 10 OF 19

FIG. 10, "LACTH" should read --LATCH--.

COLUMN 3

Line 7, "the ghost" should read --ghosts--.
Line 16, "the" should be deleted.
Line 32, "the ghost" should read --ghosts--.

COLUMN 6

Line 61, "being" should be deleted.

UNITED STATES PATENT AND TRADEMARK OFFICE
CERTIFICATE OF CORRECTION

PATENT NO. : 5,361,145

DATED : November 1, 1994

INVENTOR : SHIZUO HASEGAWA

It is certified that error appears in the above-identified patent and that said Letters Patent is hereby corrected as shown below:

COLUMN 8

Line 20, "W(2), W(i),..." should read
--W(2),...,W(i),--.
Line 42, "lump" should read --lamp--.
Line 56, "wavelength" should read --wavelengths--.
Line 66, "As above" should read --in the above--.

COLUMN 11

Line 13, "A2(=Ao-$\beta$" should read --A2(=Ao-$\beta$)--.

COLUMN 14

Line 12, "one dimensional" should read
--one-dimensional--.

Signed and Sealed this

Eleventh Day of April, 1995

Attest:

BRUCE LEHMAN

Attesting Officer     Commissioner of Patents and Trademarks